United States Patent
Källen et al.

(10) Patent No.: US 10,352,217 B2
(45) Date of Patent: Jul. 16, 2019

(54) METHOD FOR CONTROLLING THE INJECTION OF REDUCTANT FOR AN EXHAUST AFTER TREATMENT UNIT

(71) Applicant: VOLVO TRUCK CORPORATION, Göteborg (SE)

(72) Inventors: Per-Olof Källen, Västra Frölunda (SE); Henrik Nilsson, Askim (SE)

(73) Assignee: Volvo Truck Corporation, Göteborg (SE)

( * ) Notice: Subject to any disclaimer, the term of this patent is extended or adjusted under 35 U.S.C. 154(b) by 49 days.

(21) Appl. No.: 15/561,034

(22) PCT Filed: Apr. 10, 2015

(86) PCT No.: PCT/EP2015/057828
§ 371 (c)(1),
(2) Date: Sep. 23, 2017

(87) PCT Pub. No.: WO2016/162081
PCT Pub. Date: Oct. 13, 2016

(65) Prior Publication Data
US 2018/0073408 A1 Mar. 15, 2018

(51) Int. Cl.
*F01N 3/20* (2006.01)
*F01N 9/00* (2006.01)

(52) U.S. Cl.
CPC ............ *F01N 3/208* (2013.01); *F01N 3/2066* (2013.01); *F01N 3/2073* (2013.01); *F01N 9/00* (2013.01);
(Continued)

(58) Field of Classification Search
CPC ...... F01N 3/2066; F01N 3/2073; F01N 3/208; F01N 9/00; F01N 2570/14;
(Continued)

(56) References Cited

U.S. PATENT DOCUMENTS 8,920,757 B1   12/2014  Chandrapati et al.
2010/0024393 A1   2/2010  Chi et al.
(Continued)

FOREIGN PATENT DOCUMENTS

DE   102011118214 A1   5/2013
EP       1164266 A2   12/2001

OTHER PUBLICATIONS

International Search Report (dated Dec. 18, 2016) for corresponding International App. PCT/EP2015/057828.
(Continued)

*Primary Examiner* — Brandon D Lee
(74) *Attorney, Agent, or Firm* — WRB-IP LLP (57) ABSTRACT

A method is provided for controlling the injection, by a reductant injector in an exhaust system for an internal combustion engine, of reductant for an exhaust aftertreatment unit of the exhaust system, for example a selective catalytic reduction (SCR) unit. The method includes determining a reductant injection debt in dependence on a reductant flow according to at least a first request being higher than a threshold of the reductant flow, and, at least partly in dependence on the reductant injection debt, controlling the reductant injector so as to inject a compensation flow.

24 Claims, 5 Drawing Sheets

(52) U.S. Cl.
CPC ...... *F01N 2570/14* (2013.01); *F01N 2610/02* (2013.01); *F01N 2610/146* (2013.01); *F01N 2900/08* (2013.01); *F01N 2900/14* (2013.01); *F01N 2900/1402* (2013.01); *F01N 2900/1404* (2013.01); *F01N 2900/1602* (2013.01); *F01N 2900/1622* (2013.01); *F01N 2900/1812* (2013.01); *F01N 2900/1821* (2013.01); *Y02A 50/2325* (2018.01); *Y02T 10/24* (2013.01); *Y02T 10/47* (2013.01)

(58) Field of Classification Search
CPC ........... F01N 2610/02; F01N 2610/146; F01N 2900/08; F01N 2900/14; F01N 2900/1402; F01N 2900/1404; F01N 2900/1602; F01N 2900/1622; F01N 2900/1812; F01N 2900/1821; Y02A 50/2325; Y02T 10/24; Y02T 10/47
See application file for complete search history.

(56) References Cited

U.S. PATENT DOCUMENTS

2010/0050597 A1\* 3/2010 Crehan .................. F01N 3/035
60/274
2011/0283678 A1 11/2011 Zanetti et al.
2012/0067028 A1 3/2012 Clerc et al.
2014/0127097 A1\* 5/2014 Lack .................. B01D 53/9495
423/212

OTHER PUBLICATIONS

International Preliminary Report on Patentability (dated May 26, 2017) for corresponding International App. PCT/EP2015/057828.

\* cited by examiner

METHOD FOR CONTROLLING THE INJECTION OF REDUCTANT FOR AN EXHAUST AFTER TREATMENT UNIT

BACKGROUND AND SUMMARY

The invention relates to a method for controlling the injection, by a reductant injector in an exhaust system for an internal combustion engine, of reductant for an exhaust aftertreatment unit of the exhaust system, for example a selective catalytic reduction (SCR) unit. The invention also relates to a computer program, a computer readable medium, a controller, and a vehicle.

Selective catalytic reduction (SCR) is known for reducing nitrogen oxides (NOx) in emissions from internal combustion engines, for example diesel engines used in heavy vehicles such as trucks or buses. SCR basically converts NOx with the aid of a catalyst into nitrogen and water. SCR involves adding a reductant, e.g. a gaseous reduction, such as anhydrous ammonia, aqueous ammonia or urea, to the exhaust gas, whereby the reductant is adsorbed onto the catalyst, presenting a carrier and an active catalytic component. Such reductant may be known under names like AdBlue or DEF. It should be noted that where urea is used, it is usually convened to ammonia before being absorbed.

A challenge in SCR operation is to provide for a reductant injection flow which is adapted to the current operating condition of the engine and the exhaust system. The result can be inadequate reduction of NOx. Suggestions to improve the control of SCR operation have been made. EP1164266A2 discloses determining the $NO_x$, conversion and the ammonia concentration downstream of an SCR unit, and using these for control of the amount of ammonia supplied to the SCR. US2011283678 discloses switching between closed and open loop urea controlling procedures based on a SCR influencing parameter. US20120067028 describes determining an SCR degradation value used in control of the supply of reductant.

However, with increasingly higher demands on exhaust aftertreatment, there is still a desire to further improve the control of SCR.

It is desirable to improve the control of the injection of reductant for an exhaust aftertreatment unit in a vehicle. It is also desirable to secure adequate reduction of NOx in an exhaust aftertreatment unit in a vehicle.

According to an aspect of the invention, a method is provided for controlling the injection, by a reductant injector in an exhaust system for an internal combustion engine, of reductant for an exhaust aftertreatment unit of the exhaust system, for example a selective catalytic reduction (SCR) unit, characterised in determining a reductant injection debt in dependence on a reductant flow according to at least a first request being higher than a threshold of the reductant flow, and at least partly in dependence on the reductant injection debt, controlling the reductant injector so as to inject a compensation flow.

The invention is particularly advantageous where the threshold of the reductant flow is a maximum flow of a reductant dosing system comprising the reductant injector. The invention provides a parameter in the form of the reductant injection debt, which can be adjusted upon an indication on the reductant flow according to at least the first request being higher than a maximum reductant flow limit. The invention is based on the realisation that reductant requests exceeding the capacity of the reductam injector can provide inaccuracies in the control, of the exhaust aftertreatment unit. The problem normally occurs at, high engine loads where the NOx flow is normally high. The problem is particularly pronounced in connection with engines with very high engine out NOx flows, having exhaust systems with so called extended SCR variants. The problem is also especially high where exhaust system controllers are adapted to compensate for reductant diluted with water, which is done by increasing the reductant injection flow. Reductant requests exceeding the capacity of the reductant dosing system may result in increased system out NOx.

The invention provides, through the reductant injection debt and the compensation flow, for requested reductant which has not been injected, for example due to hardware restrictions of the reductant dosing system, to be injected through a debt repayment as soon as lower requested reductant injection flows allow it, e.g. in view of hardware restrictions. This reduces the system out NOx impact in particular at transient engine operations. Since the invention allows for the demanded reductant to be injected as soon as possible, it allows the total mass of finally injected reductant to be approximately the same as the demanded reductant mass.

Besides better SCR efficiency average in transient operations, advantages of the invention include a reduced need, due to the better SCR efficiency, for controlling the engine to provide a low engine out NOx level. Such low engine out NOx control increases fuel consumption and engine out soot emissions. Thus, the reduced need for low engine out NOx control will reduce fuel consumption and soot emissions. Also, the improved reductant injection control of the invention provides for an increased margin to an inducement trigger threshold for redact dilution tampering.

It should be noted that the reductant injection debt could be provided in any suitable unit, e.g. expressed in volume, or mass. The reductant flow can be provided in any suitable unit. e.g. expressed in volume flow, or mass flow. It should be noted that the reductant flow according to at least the first request could be a single flow based on one or several requests, or a number of flows, each according to a respective request. Preferably, the reductant injection debt is determined in dependence on a reductant flow according to a first request being higher than a threshold of the reductant flow.

Preferably, the reductant injector is controlled so as to inject the compensation flow in addition to a subsequent injection of a reductant flow according to a second request. Preferably, the reductant flow according to the second request is below the threshold of the reductant flow. Thereby, where subsequently to the situation, with a requested reductant flow being higher than the maximum reductant flow, a situation is identified in which the requested reductant flow is less than the maximum reductant flow, the compensation flow is injected and thereby the reductant debt can be "repaid". The situation in which the requested reductant flow is less than the maximum reductant flow may be identified when it occurs, or by a predictive operation based on values of relevant engine and/or exhaust system parameters.

Preferably, determining the reductant injection debt comprises determining the reductant injection debt at least partly based on the excess of the reductant flow according to the first request in relation to the threshold of the reductant flow. Preferably, the step of determining the reductant injection debt comprises determining whether to increment the reductant injection debt. Preferably, determining the reductant injection debt comprises increasing the reductant injection debt if the reductant flow according, to the first request is higher than the threshold of the reductant flow. Thereby, the adjustment of the reductant injection debt is related to the surplus of the reductant flow according to the first request in relation to the threshold of the reductant flow. This provides for the reductant debt may to accurately reflect omitted injections due to the injection system restrictions.

Preferably, the step of controlling so as to inject the compensation flow is dependent on a decision on whether to inject the compensation flow or not. Thereby the compensation flow injection can be directly dependent not only on the reductant injection debt, but also on other parameters and conditions, which may advantageously be taken into consideration for the reductant flow control.

Preferably, the compensation flow is partly dependent on the size of the reductant injection debt. For example, depending on the size of the reductant injection debt, the calculation of the compensation flow can be adjusted. E.g., the compensation flow can be set to zero if the reductant debt is zero, or the size of a non-zero reductant debt can be decisive for the compensation flow size.

Preferably, the method comprises determining an age of the reductant injection debt, wherein the control so as to inject the compensation flow is partly dependent on the determined debt age. Thereby, when compensating for non-injected portions of requested reductant injections, the compensation flow might be reduced due to the debt age. Thereby consideration may be taken to the fact that where the debt age is relatively high, benefits of a full compensation flow might be less pronounced. Determining the debt age may involve storing, when recording in a data storage an increment of the reductant injection debt, an entry of the time of the recording. The stored data of the reductant injection debt may thereby include a number of registrations of respective points in time of respective debt portions corresponding to respective debt increments. In some embodiments, the debt age is determined as the average age of the debt increments in the reductant injection debt. In other embodiments, the debt age is determined as the age of the oldest debt increment in the reductant injection debt. The debt age might be determined any suitable manner, even as the age of the most recent debt increment in the reductant injection debt.

Preferably, the method comprises determining an operational condition of the internal combustion engine or the exhaust system, wherein the control so as to inject the compensation flow is partly dependent on the determined operational condition. Thereby, the compensation flow might be reduced due to the operational condition. Thereby consideration may be taken to the fact that under some operational conditions, a reduced compensation flow might provide the same benefits as a full compensation flow, or even provide improved benefits.

Preferably, the method comprises determining a temperature in the exhaust system, for example in the exhaust aftertreatment unit, wherein the control so as to inject the compensation flow is partly dependent on the determined temperature. Thereby, the control so as to inject the compensation flow can be partly on dependent on a rate of change of said temperature. Thereby consideration may be taken to the fact that the benefits provided by the compensation flow will be dependent on the temperature or the rate of change of the temperature of the exhaust aftertreatment unit.

Preferably, the method comprises determining a condition of a buffer of reductant exhaust aftertreatment unit of in the exhaust system, wherein the control so as to inject the compensation flow is partly dependent on the determined condition of the buffer of reductant. Thereby consideration may be taken to the fact that the benefits provided by the compensation flow will be dependent on the reductant buffer of the exhaust aftertreatment unit. For example, where there is, a relatively high amount of reductant in the reductant buffer, the benefits of a reduced compensation flow might be the same or higher than those of a full compensation flow.

Preferably, the method comprises determining an amount of nitrogen oxides in exhaust gases in the exhaust system, wherein the control so as to inject the compensation flow is partly dependent on the determined amount of nitrogen oxides. Thereby consideration may be taken to the fact that the benefits provided by the compensation flow will be dependent on the amount of nitrogen oxides in exhaust, gases. For example, where there is a relatively low amount of nitrogen oxides in exhaust gases, the benefits of a reduced compensation flow might be the same or higher than those of a full compensation flow.

Preferably, the method comprises determining a decrease of the reductant injection debt at least partly based on the compensation flow. Thereby, the reductant injection debt may be reduced as the debt is "repaid" by the compensation flow.

Preferably, the method comprises determining a decrease of the reductant injection debt at least partly based on the size of the reductant injection debt. Thereby consideration may be taken to the fact that at relatively large reductant injection debts, reduction of the full debt solely by injection of a compensation flow may not provide any benefits in relation to the injection of a compensation flow for full reduction of a smaller debt. A reason for this might be that the "repayment" of a large debt will take a relatively long time, during which the effects sought by the injection requests made when the debt was build up, will not be provided anymore, e.g. due to changed operational circumstances.

Preferably, the method comprises determining an age of the reductant injection debt, and determining a decrease of the reductant injection debt at least partly based on the age of the reductant injection debt. Thereby consideration may be taken to the fact that where the debt age is relatively high, benefits of a full compensation flow might be less pronounced.

Preferably, the method comprises determining an operational condition of the internal combustion engine or the exhaust system, and determining a decrease of the reductant injection debt at least partly based on the determined operational condition. Thereby an advantageous feature is provided since a full "repayment" of the debt might under some operational conditions provide the same or even less beneficial results as a "repayment" of a reduced debt. Thereby, the injection of an unnecessary surplus of reductant is avoided.

Preferably, the method comprises determining a temperature in the exhaust system, for example in the exhaust aftertreatment unit, and determining a decrease of the reductant injection debt at least partly based on the determined temperature. This is advantageous since a repayment of a full debt might at some exhaust system temperatures provide the same or even less beneficial results as a repayment of a reduced debt. Thereby, the injection of an unnecessary surplus of reductant is avoided.

Preferably, the method comprises determining a condition of a buffer of reductant in the exhaust aftertreatment unit, and determining a decrease of the reductant injection debt at least partly based on the condition of the buffer of reductant. Thereby, the reductant injection debt may be "forgotten" if no emission benefit to inject the reductant injection debt can be reached due to the reductant buffer situation. Alternatively, the reductant injection debt may be partly reduced due to the reductant buffer situation. Thereby, the injection of an unnecessary surplus of reductant is avoided.

Preferably, the method comprises determining an amount of nitrogen oxides in exhaust gases in the exhaust system, and determining a decrease of the reductant injection debt at least partly based on the determined amount of nitrogen oxides. This is advantageous since a repayment of a full debt might at some exhaust gas nitrogen oxide concentrations provide the same or even less beneficial results as a repayment of a reduced debt. Thereby, the injection of an unnecessary surplus of reductant is avoided.

Determining a decrease of the reductant injection debt may comprise determining a rate of decrease of the reductant injection debt. Thereby an advantageous manner of adjusting the debt, e.g. due to the operational situation of the exhaust system, is provided.

Preferably, the method comprises determining a first torque of the engine, wherein the first requested reductant flow is determined at least partly based on the first engine torque. Preferably, the method comprises determining a second torque of the engine, wherein the second requested reductant flow is determined at least partly based on the second engine torque.

DESCRIPTION OF DRAWINGS

Below embodiments of the invention will be described (with reference to the drawings in which FIG. 1 shows a partially sectioned side view of a vehicle in the form of a truck, FIG. 2 shows schematically components of an internal combustion engine and an exhaust system of the vehicle in FIG. 1, FIG. 3 shows a block diagram depicting steps in a method according to an embodiment of the invention, FIG. 4 is a diagram showing, as a function of time, requests of a flow of reductant to be injected into the exhaust system in FIG. 2, FIG. 5 is a diagram showing, within the same time interval as in FIG. 4, adjusted flows of reductant injected into the exhaust system in FIG. 2, and FIG. 6 shows a block diagram depicting steps in a method according to an alternative embodiment of the invention.

DETAILED DESCRIPTION

Figure 1:
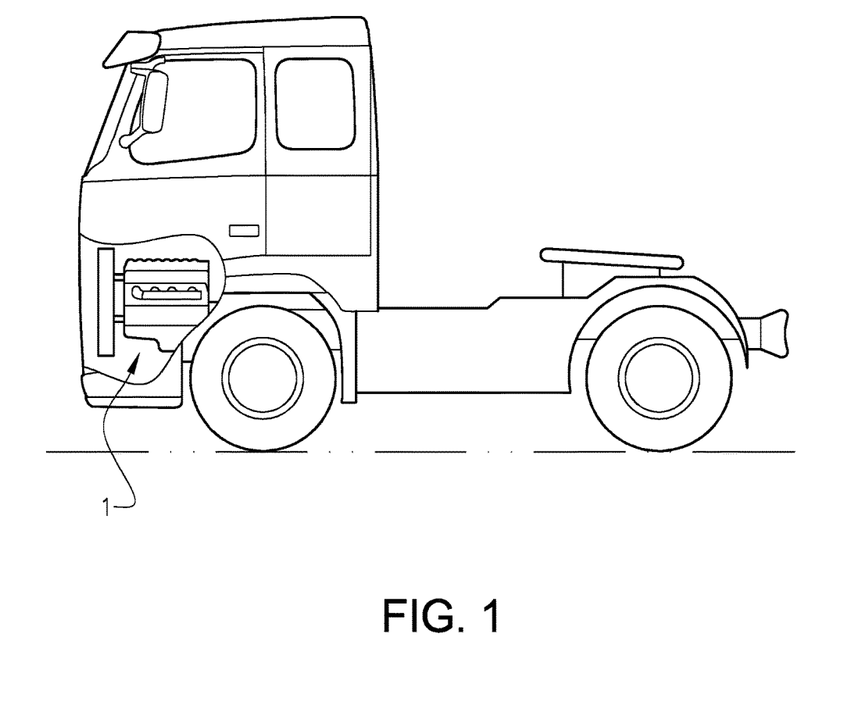

FIG. 1 shows a vehicle in the form of a truck with an internal combustion engine 1. As can be seen the engine 1 is provided with a turbo charger 101 adapted to provide pressured inlet air to an inlet manifold 102 via an intercooler 103. The turbo charger 101 comprises a turbine adapted to be driven with a flow of exhaust gases provided via an exhaust manifold 104 of the engine. Downstream of the exhaust manifold 104 and the turbo charger 101, and exhaust system 2 is provided.

Figure 2:
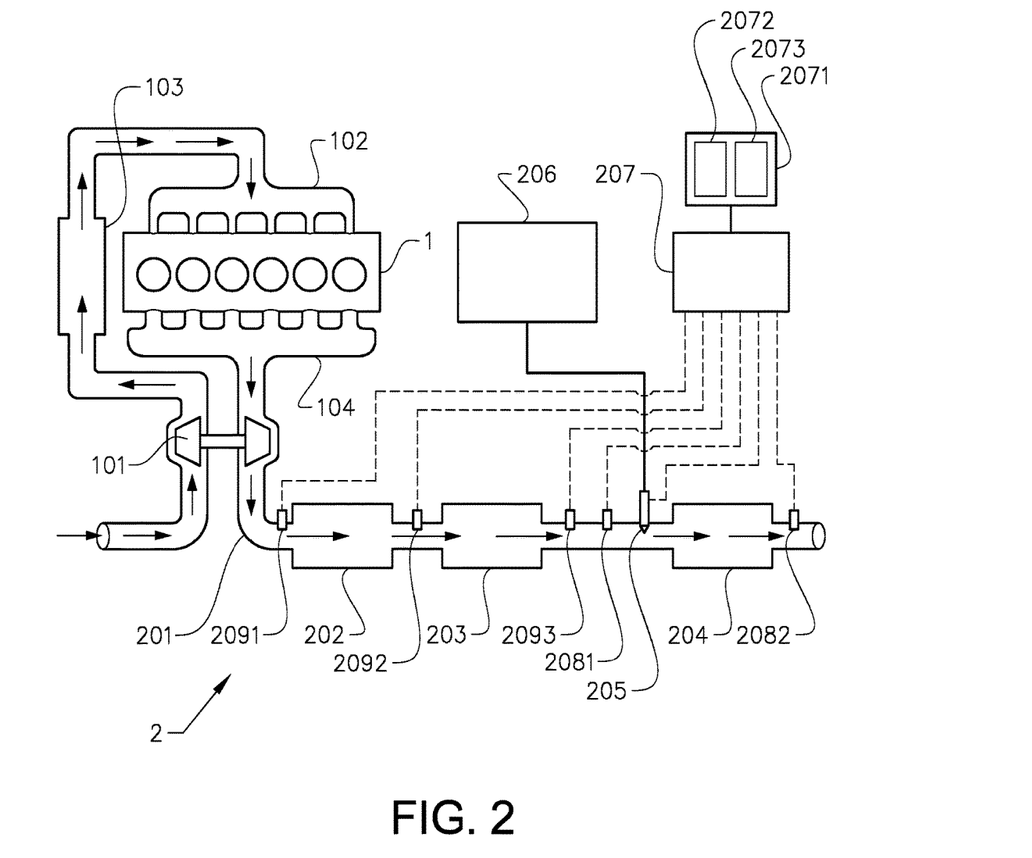

The exhaust system 2 comprises an exhaust conduit 201 adapted to guide exhaust gases from the engine 1 through a number of aftertreatment units 202-204 distributed along the exhaust conduit 201. The aftertreatment units are provided in the form of a diesel oxidation catalyst (DOC) 202, a diesel particulate filter (DPF) 203 located downstream of the DOC 202, and a selective catalytic reduction (SCR) unit 204 located downstream of the DPF 203.

The exhaust system 2 further comprises an assembly for injection of reductant for the SCR unit 204. The reductant injection assembly, herein also referred to as a reductant dosing system, comprises a reductant injector 205 adapted to be fed with reductant from a reductant storage container 206. The injector is arranged to inject reductant upstream of the SCR unit 204.

A controller 207 is adapted to control the it of reductant with the injector 205. The controller 207 is adapted to access a data storage 2071. The controller 207 is also adapted to be fed with signals from a first and a second nitrogen oxide (NOx) sensor 2081, 2082. The first NOx sensor 2081 is located upstream of the SCR unit 204, and the second NOx sensor 2082 is located downstream of the SCR unit 204. The first and second NOx sensors 2081, 2082 are adapted to send to the controller 207 signals indicative of the level of NOx in the exhaust gases, upstream and downstream, respectively, of the SCT unit. The controller 207 is also adapted to determine the engine torque and the exhaust gas flow, based partly on the engine torque. Based on the exhaust gas flow, and the signals from the first and second NOx sensors 2081, 2082, the controller is adapted to determine the NOx flow upstream and downstream of the SCR unit 204.

The controller 207 also is adapted to be fed with signals from a first, a second and a third temperature sensor 2091, 2092, 2093. The first temperature sensor 2091 is located upstream of the DOC 202, the second temperature sensor 2092 is located between the DOC 202 and the DPF 203, and the third temperature sensor 2093 is located between the DPF 203 and the SCR unit 204. The temperature sensors 2091, 2092, 2093 are adapted to send to the controller 207 signals indicative of the temperatures at the respective temperature sensor locations. As mentioned, the controller 207 is also adapted to determine the engine torque and the exhaust gas flow, based partly on the engine torque. The controller 207 is further adapted to determine, based on the signals from the temperature sensors 2091, 2092, 2093 and the determined exhaust gas flow, the temperature in the SCR unit 204.

It should be noted that alternatives are possible for determining the exhaust gas NOx content, and the temperature in the SCR unit 204. For example, the temperature in the SCR unit 204 can be determined with a temperature sensor in the SCR unit 204.

The controller 207 is also adapted to determine a condition of a buffer of reductant in the SCR, unit 204. The condition of the reductant buffer is indicative of the concentration of reductant on the surfaces of carriers on the SCR unit 204, and is herein also referred to as the reductant buffer size. Determining the condition of the reductant buffer may be done by estimating the condition of the reductant buffer. In this embodiment, the reductant buffer size is determined based on stored data, accessible to the controller 207, indicative of the history of operational conditions of the internal combustion engine and the exhaust system. The stored data includes historic values of the reductant injection flows, the engine torque, the temperature of the SCR unit 204, the rate of change of said temperature, and the NOx flow upstream and downstream of the SCR unit 204.

The controller 207 is further adapted to control the reductant injector 205 as exemplified below. The flow from the injector 205 can be controlled to assume any value between zero flow and a threshold flow being a maximum flow dictated by a performance limitation of the injector 205.

Figure 3:
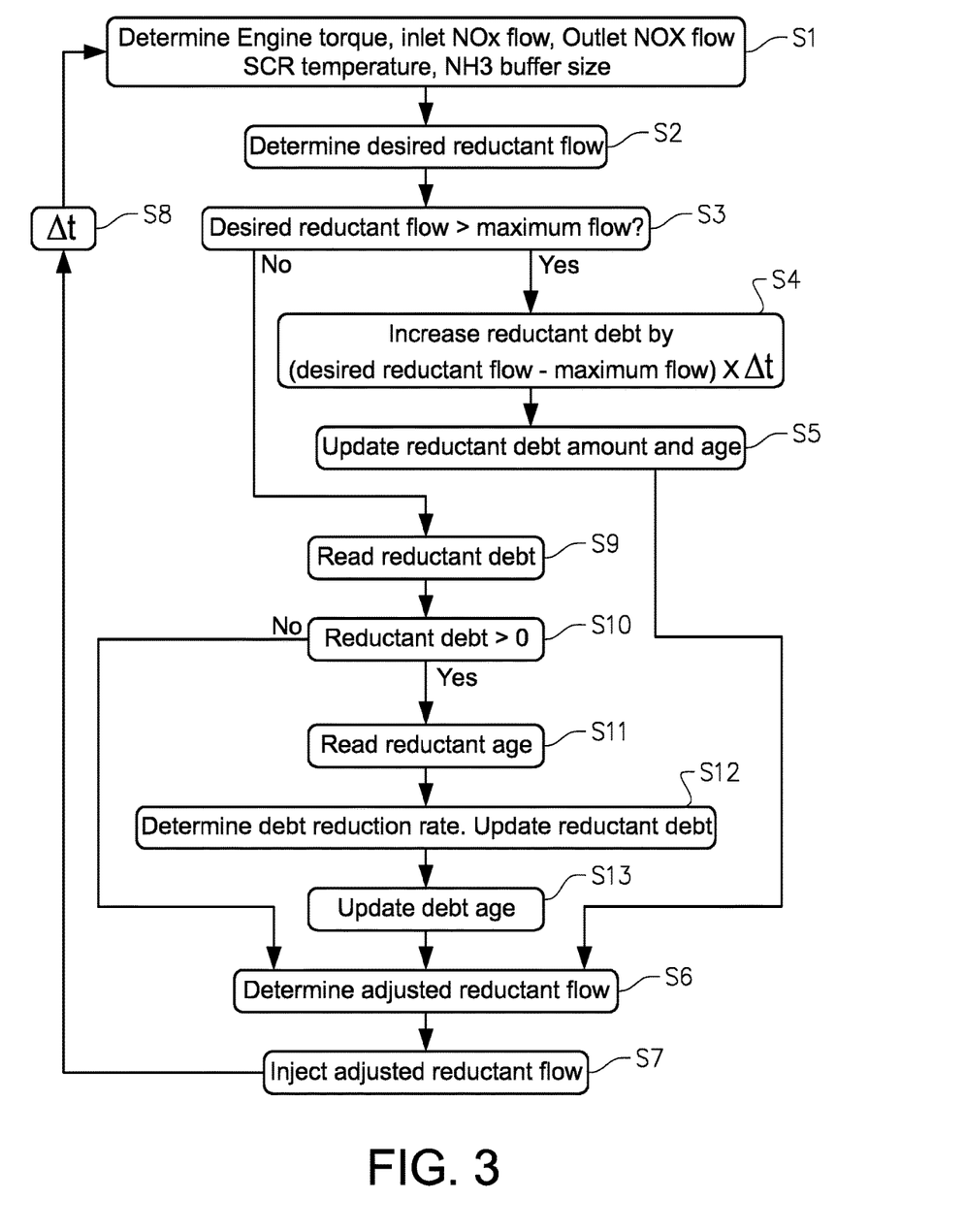
Figure 4:
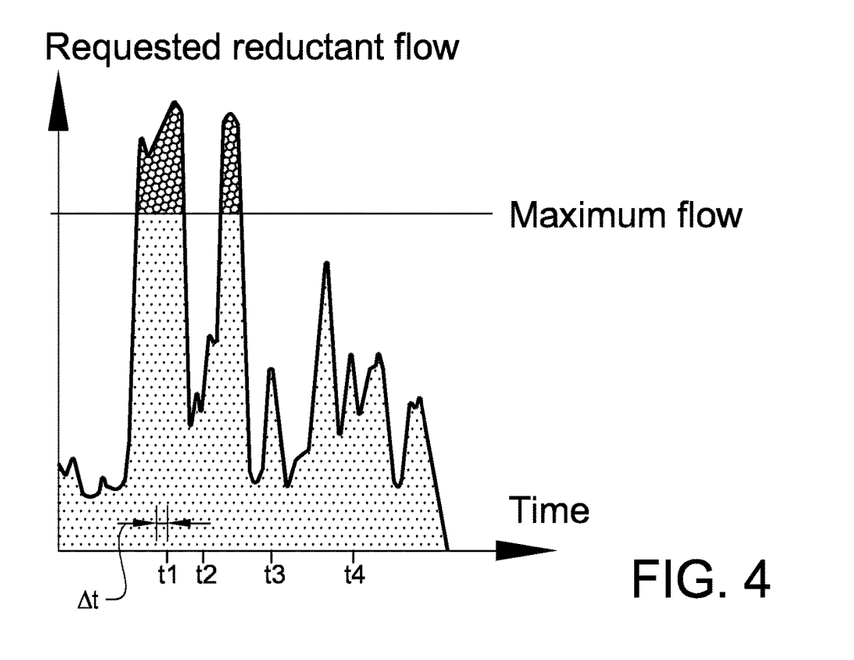
Figure 5:
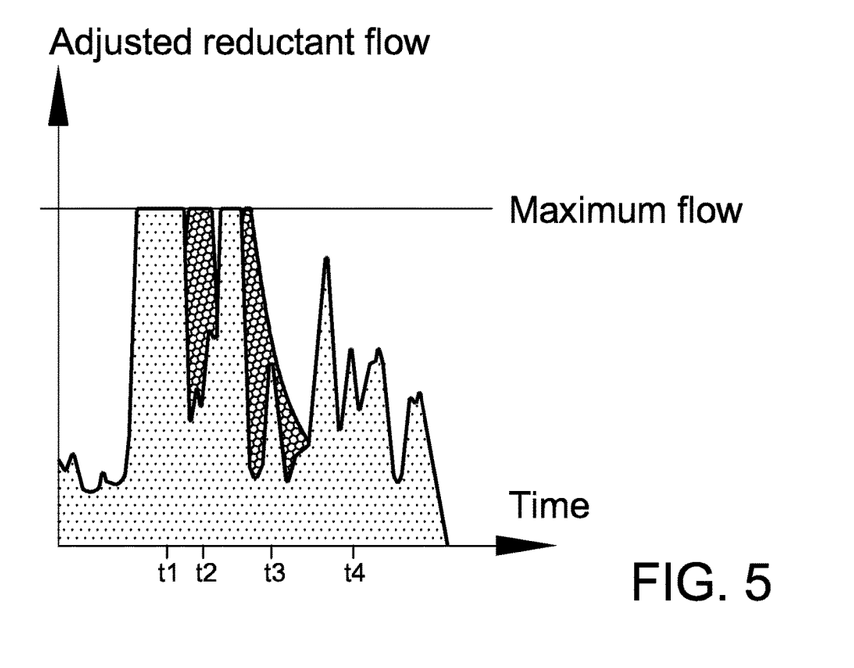

With reference to FIG. 3. FIG. 4 and FIG. 5, a method for controlling the injection of reductant for the SCR unit 204 will be described. The method comprises a series of steps, with some alternatives as described below, repeated periodically within a time interval, Δt, depicted in FIG. 4.

The controller 207 determines S1 an operational condition of the internal combustion engine and the exhaust system, by determining S1 the values of a number of parameters, i.e. the engine torque, the temperature of the SCR unit 204, the rate of change of said temperature, the reductant buffer size, and the NOx flow upstream and downstream of the SCR unit 204.

Based on the determined operational condition, the controller determines S2 a reductant flow according to a request, herein also referred to as a desired reductant flow. The controller then determines S3 whether or not the desired reductant flow is larger than the maximum flow.

As depicted in FIG. 2, the data storage 2071, accessible to the controller 207, is adapted to store values of a parameter 2072 indicative of accumulated excesses of desired reductant flows from a number of executions of the method depicted in FIG. 3, in relation to the maximum flow. This parameter 2072 is herein referred to as a reductant injection debt, or reductant debt. Any suitable unit could be used for the reductant debt 2072, e.g. grams, and similarly, any suitable unit could be used for the reductant injection flow, e.g. grams per second.

The data storage 2071 is also adapted to store values of a parameter 2073 indicative of the age 2073 of the reductant debt 2072. Determining the debt age 2073 involves storing, when recording increments of the reductant debt 2072, entries of the respective points in time of the recordings. In this embodiment, the debt age 2073 is determined as the average age of the debt increments in the reductant debt 2072.

If it is determined S3 that the desired reductant flow is larger than the maximum flow, e.g. at the time t1 in FIG. 4, the reductant debt 2072 is increased by an amount determined by calculating the difference between the desired reductant flow and the maximum flow, and multiplying this difference with Δt. The reductant debt increase is recorded S5 in the data storage 2071. A desired reductant flow which is larger than the maximum flow is herein also referred to as a first desired reductant flow, or a reductant flow according to a first request.

Also an update of the debt age 2073 is recorded S5 in the data storage 2071. More specifically, since the reductant debt 2072 is simultaneously increased, the debt age 2073 is determined as an updated average age of the debt increments in the reductant debt 2072.

In addition, an adjusted reductant flow is determined S6. Since the desired reductant flow is larger than the maximum flow, the adjusted flow is set to the maximum flow. The result can, be seen in FIG. 5 at t1. The controller 207 controls S7 the injector 205 so as to inject the maximum flow. In alternative embodiments, the adjusted flow can be set, e.g. in dependence on the temperature in the SCR unit 204, to be lower than the maximum flow, i.e. between the maximum flow and the desired reductant now.

The controller 207 then starts over with determining S1 again the operational condition of the internal combustion engine and the exhaust system, at a time following the immediately preceding operational condition determination by the time interval, Δt S8.

As can be seen in FIG. 4, in the example presented here, for a number cycles of the method preceding and following the one at t1, the desired reductant flow is larger than the maximum flow, and the steps described above are repeated, each time providing a further increase of the reductant debt 2072, an update of the debt age 2073, and an injection of the maximum flow.

At other points in time, e.g. at t2 (FIG. 4), it is determined S3 that the desired reductant flow is smaller than the maximum flow. A desired reductant flow which is smaller than the maximum flow is herein also referred to as a second desired reductant flow, or a reductant flow according to a second request.

Where it is determined S3 that the desired reductant flow is smaller than the maximum flow, the controller reads S9 the reductant debt 2072 in the data storage 2071. If it is determined S10 that the reductant debt is larger than zero, the controller reads S11 the debt age 2073 in the data storage 2071. Based on the debt age 2073 and the operational condition determined in step S1, (including the engine torque, the temperature of the SCR unit 204, the rate of change of said temperature, the reductant buffer size, and the NOx flow upstream and downstream of the SCR unit 204), the controller determines S12 a rate of reduction of the reductant debt 2072. More specifically, depending on the debt age 2073, for example lithe debt age 2073 is below a threshold value, the debt reduction rate is determined S12 by calculating the difference between the maximum flow and the desired reductant flow, multiplying this difference with Δt, and reducing the reductant debt 2072 by the result. The debt age is adjusted S13.

An adjusted reductant flow is determined S6 to be the maximum flow. The result can be seen in FIG. 5 at t2. The controller 207 controls S7 the injector 205 so as to inject the maximum flow. The difference between the maximum flow and the desired reductant flow is herein referred to as a compensation flow. The compensation flow is injected in addition to the desired reductant flow.

As can be seen in FIG. 4, in the example presented here, for a number cycles of the method preceding and following the one at t2, the desired reductant flow is smaller than the maximum flow, and the steps described above are repeated, each time providing a further decrease of the reductant debt 2072, an update of the debt age 2073, and an injection of the maximum flow.

At further points in time, e.g. at t3 (FIG. 4), it is determined S3 that the desired reductant flow is smaller than the maximum flow. Here, depending on the debt age 2073, e.g. based on a determination that the debt age 2073 is above the threshold value, and the debt reduction rate is determined S12 by reducing the reductant debt 2072 by an amount which is lower than Δt multiplied by the difference between the maximum flow and the desired reductant flow. The debt age is adjusted S13. The adjusted reductant flow, i.e. the sum of the desired reductant flow and the compensation flow, is determined S6 to be the lower that the maximum flow but higher than the desired reductant flow. The result can be seen in FIG. 5 at t3. The controller, taking into account the gradually increasing debt age 2073 in this manner, provides a gradually reduced adjusted reductant flow in method cycles preceding and following the one at t3 FIG. 5.

At further points in time, e.g. at t4 (FIG. 4), it is determined S3, S10 that the desired reductant flow is smaller than the maximum flow, and that the reductant debt is zero. As a result, the adjusted reductant flow is determined S6 as equal to the desired reductant flow.

Figure 6:
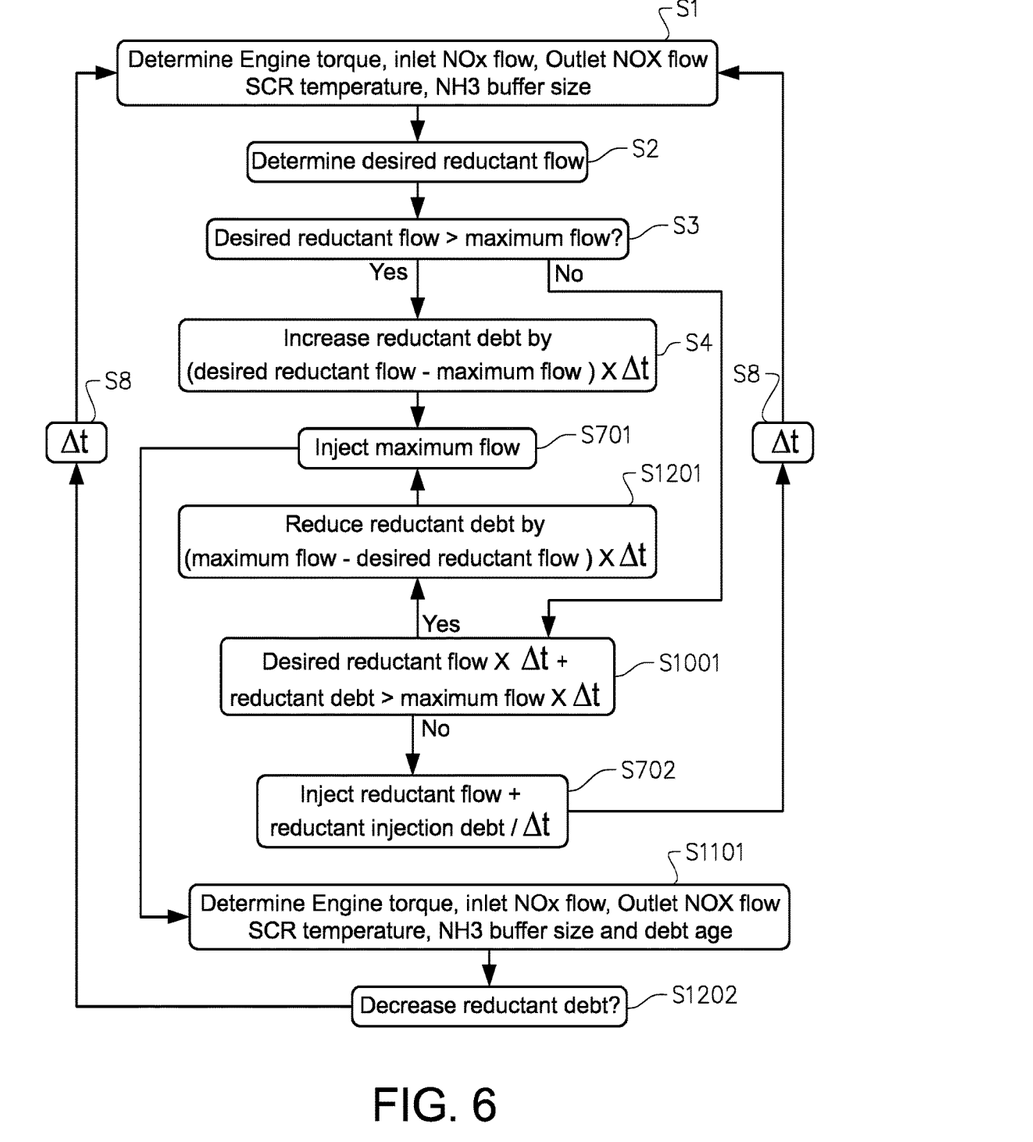

With reference to FIG. 6, an alternative method for controlling the injection of reductant for the SCR unit 204 will be described. The alternative method has similarities to the method described with reference to FIG. 3, and below focus is made on the differences.

If it is determined S3 that the desired reductant flow is larger than the maximum flow the redactant debt 2072 is increased S4 as in the method described with reference to FIG. 3, and the reductant debt increase is recorded in the data storage 2071. The controller 207 controls the injector 205 so as to inject S701 the maximum flow.

The controller 701 then determines S1101 an operational condition by determining the engine torque, the temperature of the SCR unit 204, the rate of change of said temperature, the reductant buffer size, and the NOx flow upstream and downstream of the SCR unit 204. The controller 701 also determines S1101 the debt age 2073. Based on this determination S1101 the controller determines S1202 whether to decrease the reductant debt.

The controller 207 then starts over with determining S1 again the operational condition of the internal combustion engine and the exhaust system.

Where it is determined S3 that the desired reductant flow is smaller than the maximum flow, the controller determines S1001 whether the sum of the desired reductant flow multiplied by Δt and the reductant debt is larger than the maximum flow multiplied by Δt. If the answer is yes, the reductant debt is reduced S1201 by the product of Δt and the difference between the maximum flow and the desired reductant flow. The controller 207 controls the injector 205 so as to inject S701 the maximum flow.

The controller 701 then determines S1101 the operational condition as detailed above and the debt age 2073, and based on this determination S1101 the controller determines S1202 whether to decrease the reductant debt. The controller 207 then starts over with step S1 again.

Where it is determined S3 that the desired reductant flow is smaller than the maximum flow, and it is determined S1001 that the sum of the desired reductant flow multiplied by Δt and the reductant debt is smaller than the maximum flow multiplied by Δt, the controller 207 controls the injector 205 so as to inject S702 the sum of the desired reductant flow and the reductant debt divided by Δt. The controller 207 then starts over with step S1 again.

The invention claimed is:

1. A method for controlling the injection of reductant for an exhaust aftertreatment unit of an exhaust system for an internal combustion engine by a reductant injector in the exhaust system, the method comprising
determining a reductant injection debt in dependence on a reductant flow according to at least a first request begin higher than a threshold of the reductant flow, and at least partly in dependence on the reductant injection debt, controlling the reductant injector so as to inject a compensation flow,
and
determining an age of the reductant injection debt, wherein the control so as to inject the compensation flow is partly dependent on the determined debt age.

2. The method according to claim 1, wherein the threshold of the reductant flow is a maximum flow of a reductant dosing system comprising the reductant injector.

3. The method according to claim 1, wherein the reductant injector is controlled so as to inject the compensation flow in addition to a subsequent injection of a reductant flow according to a second request.

4. The method according to claim 3, wherein the reductant flow according to the second request is below the threshold of the reductant flow.

5. The method according to claim 1, wherein determining the reductant injection debt comprises determining the reductant injection debt at least partly based on excess of the reductant flow according to the first request, in relation to the threshold of the reductant flow.

6. The method according to claim 1, wherein the step of determining the reductant injection debt comprises determining whether to increment the reductant injection debt.

7. The method according to claim 1, wherein determining the reductant injection debt comprises increasing the reductant injection debt if the reductant flow according to the first request is higher than the threshold of the reductant flow.

8. The method according to claim 1, wherein the step of controlling so as to inject the compensation flow is dependent on a decision on whether to inject the compensation flow or not.

9. The method according to claim 1, wherein the compensation flow is partly dependent on the size of the reductant injection debt.

10. The method according to claim 1, comprising determining an operational condition of the internal combustion engine or the exhaust system, wherein the control so as to inject the compensation flow is partly dependent on the determined operational condition.

11. The method according to claim 1, comprising determining a condition of a buffer of reductant in the exhaust aftertreatment unit, wherein the control so as to inject the compensation flow is partly dependent on the determined condition of the buffer of reductant.

12. The method according to claim 1, comprising determining an amount of nitrogen oxides in exhaust gases in the exhaust system, wherein the control so as to inject the compensation flow is partly dependent on the determined amount of nitrogen oxides.

13. The method according to claim 1, comprising determining a decrease of the reductant injection debt at least partly based on the compensation flow.

14. The method according to claim 1, comprising determining a decrease of the reductant injection debt at least partly based on the size of the reductant injection debt.

15. The method according to claim 1, further comprising determining a decrease of the reductant injection debt at least partly based on the age of the reductant injection debt.

16. The method according to claim 1, comprising determining an operational condition of the internal combustion engine or the exhaust system, and determining a decrease of the reductant injection debt at least partly based on the determined operational condition.

17. The method according to claim 11, comprising determining a temperature in the exhaust system, and determining a decrease of the reductant injection debt at least partly based on the determined temperature.

18. The method according to claim 1, comprising determining a condition of a buffer of reductant in an exhaust aftertreatment unit of in the exhaust system, and determining a decrease of the reductant injection debt at least partly based on the condition of the buffer of reductant.

19. The method according to claim 1, comprising determining an amount of nitrogen oxides in exhaust gases in the exhaust system, and determining a decrease of the reductant injection debt at least partly based on the determined amount of nitrogen oxides.

20. A method for controlling the injection of reductant for an exhaust aftertreatment unit of an exhaust system of an internal combustion engine by a reductant injector in the exhaust system for example a selective catalytic reduction unit, the method comprising
determining a reductant injection debt in dependence on a reductant flow according to at least a first request being higher than a threshold of the reductant flow, and at least partly in dependence on the reductant injection debt, controlling the reductant injector so as to inject a compensation flow, determining a decrease of the reductant injection debt, wherein determining a decrease of the reductant injection debt comprises determining a rate of decrease of the reductant injection debt, determining the decrease of the reductant injection debt at least partly based on the compensation flow, or determining the decrease of the reductant injection debt at least partly based on the size of the reductant injection debt, or determining an age of the reductant injection debt, and determining the decrease of the reductant injection debt at least partly based on the age of the reductant injection debt, or determining an operational condition of the internal combustion engine or the exhaust system, and determining the decrease of the reductant injection debt at least partly based on the determined operational condition, or determining a temperature in the exhaust system and determining the decrease of the reductant injection debt at least partly based on the determined temperature, or determining a condition of a buffer of reductant in an exhaust aftertreatment unit of in the exhaust system, and determining the decrease of the reductant injection debt at least partly based on the condition of the buffer of reductant, or determining an amount of nitrogen oxides in exhaust gases in the exhaust system, and determining a decrease of the reductant injection debt at least partly based on the determined amount of nitrogen oxides.

21. A computer comprising a computer program for performing the steps of claim 1 when the program is run on the computer.

22. A non-transitory computer readable medium carrying a computer program for performing the steps of claim 1 when the program is run on a computer.

23. A controller being configured to perform the steps of the method according to claim 1.

24. A vehicle comprising a controller according to claim 23.

* * * * *